United States Patent [19]

Corver et al.

[11] 4,260,592

[45] Apr. 7, 1981

[54] MANUFACTURE OF WATER-INSOLUBLE AMMONIUM POLYPHOSPHATE

[75] Inventors: Hans A. Corver; Allan J. Robertson, both of St. Catharines, Canada

[73] Assignee: Cyanamid Canada, Inc., Montreal, Canada

[21] Appl. No.: 69,416

[22] Filed: Aug. 24, 1979

[30] Foreign Application Priority Data

Dec. 18, 1978 [CA] Canada .................................. 318105

[51] Int. Cl.³ .......................................... C01B 15/16
[52] U.S. Cl. ................................................... 423/305
[58] Field of Search ..................... 423/305, 307; 71/34

[56] References Cited

U.S. PATENT DOCUMENTS

| | | | |
|---|---|---|---|
| 3,397,035 | 8/1968 | Shen et al. | 423/307 |
| 3,397,036 | 8/1968 | Narins et al. | 423/305 |
| 3,399,986 | 9/1968 | Wiegman | 71/47 |
| 3,723,074 | 3/1973 | Sears et al. | 423/307 |
| 3,976,752 | 8/1976 | Corver et al. | 423/305 |

*Primary Examiner*—O. R. Vertiz
*Assistant Examiner*—Wayne A. Langel
*Attorney, Agent, or Firm*—Paul W. Leuzzi, II

[57] ABSTRACT

Preparation of crystalline water-insoluble ammonium polyphosphate through processing a melt of urea and phosphoric acid or alternatively processing solid urea phosphate. Contact between the exiting product and recycled gaseous by-products ensures proper pH.

1 Claim, No Drawings

MANUFACTURE OF WATER-INSOLUBLE AMMONIUM POLYPHOSPHATE

This invention relates to an improved process for preparing crystalline water-insoluble ammonium polyphosphate. More particularly, this invention relates to such a process which is greatly simplified over prior art procedures and is more economical to conduct.

The production of ammonium polyphosphates for use as flame-retarding agents, has materially increased over the past few years. These ammonium polyphosphates range from water-soluble materials, through amorphous glasses, to crystalline, water-insoluble powders and have been produced utilizing a myriad of different procedures.

Ammonium polyphosphates can be represented by the generic formula

STRUCTURE I:

$$H_{(n-m+2)}(NH_4)_m P_n O_{(3n+2)}$$

wherein n is an integer having an average value greater than 10, m/n has an average value in the range of about 0.7 to 1.1, and the maximum value of m is equal to n+2.

These ammonium polyphosphates have been found useful as flame-retardant additives in the production of intumescent paints. They also impart flame-retardance to plastics, textiles, and the like when incorporated therein.

More recently, it has been found that ammonium polyphosphates in general, and crystalline, water-insoluble ammonium polyphosphates in particular, can advantageously be incorporated into wood particleboard in order to impart flame-retardance thereto. Not only do the crystalline, water-insoluble ammonium polyphosphates impart flame-retardance to the board but they also do so to the same degree as other, more widely used, flame-retardant additives and, in most instances, at lesser concentration.

In exploring the effects of ammonium polyphosphates upon the flame-retardance of particleboard, and in assessing the many different variables which exist in the process of flame-proofing particleboard with polyphosphates we have discovered that the pH of the ammonium polyphosphate plays an important role. The pH of the polyphosphate, the pH of the resinous glue which is used to bind the wood particles together during heat and pressure consolidation and the pH of the wood particles per se are all important variables which must be considered by the particleboard manufacturer. We have found that if the pHs of the ammonium polyphosphate, the resin glue and the wood chips are all substantially identical, i.e. matched to within 0.5 units of one another, not only does the polyphosphate function normally as a flame-retardant but it does not effect the curing rate of the resinous glue. That is to say, a polyphosphate of too low a pH accelerates the resin cure and thereby results in boards having inferior properties of internal bond, delamination and surface quality, especially with urea-formaldehyde resins, the most widely used resins for glueing in particleboard production. However, since the pH of ammonium polyphosphates tends to fluxuate widely depending upon the starting materials charged and the method used in the production thereof, it became necessary to be able to produce ammonium polyphosphates of a controlled or desired pH since the pH of the wood chips and that of the resin glue in particleboard production are relatively constant.

It was previously known that crystalline water-insoluble ammonium polyphosphates could be prepared by heat-treatment of suitable precursors therefor, see U.S. Pat. Nos. 3,397,035; 3,397,036; 3,399,986; 3,723,074 and 3,976,752. In certain of these processes, the product obtained contains significant portions of water-soluble products which decreases the yields of desired material. In other processes, the requirement for substantial portions of seed material from prior preparations decreases the effective product yield. In still other methods, the reaction is carried out under conditions that do not adequately break up the reaction mass and the product obtained is non-uniform. Accordingly, there exists the need for improved processes for preparing crystalline water-insoluble ammonium polyphosphates that avoid deficiencies of the prior art processes and are simpler to perform. Such a provision would fulfill a long-felt need and constitute a significant advance in the art.

In accordance with the present invention, there is provided a novel process for preparing a crystalline water-insoluble ammonium polyphosphate which is readily carried out in a continuous manner thereby providing economies in the processing steps. The process provides a uniform product, free of significant quantities of water-soluble impurities. The process requires no seed crystals from prior preparations and provides a powdery product directly. The process also provides more intimate contact of gaseous by-products with powdery product, thus ensuring desired pH of the ultimate product.

As mentioned above, this invention relates to a continuous process for the production of crystalline, water-insoluble ammonium polyphosphate which process comprises feeding a melt of urea and a condensed phosphoric acid or a solid urea phosphate into the inlet of a reaction zone maintained at a temperature in the range of about 285° C. to about 400° C. to provide a fuming viscous melt which adheres to the surfaces of said reaction zone; venting gaseous products from said fuming viscous melt from a vent in the entry end of said reaction zone; constantly removing adherents from said reactive surfaces to provide a powdery solid while advancing said solid to an exit end of said reaction zone at a rate consistent with formation of ammonium polyphosphate; and controlling release of said solid from said exit while recycling some or all of said gaseous products vented from said entry end of said reaction zone to said exit, thereby providing a solid product having a pH in the range of about 4.5 to 6.5 as it exits said reaction zone.

The process of the present invention is carried out in a suitable reaction zone which can have numerous embodiments while still enabling processing to be conducted as specified. A preferred reaction zone is a jacketed oval-shaped tubular shell having an entry port at one end and an exit port at the other end of the tube. Through the jacket can be circulated hot oil or other heated medium to provide the necessary reaction temperature. Above the front entry port is a vent which enables by-product gases to escape therefrom. This vent is essential to prevent the by-product gases from forcing the reacting mass out of the exit port too soon. Mounted within the reaction zone are driven paddles which contact each other and the surfaces of the reaction zone so that they remove reacting mass that adheres to the surfaces of the reaction zone and paddles, these paddles also act to pulverize the reacting mass and advance said mass to the exit port. The exit port is equipped with a gate that can be adjusted to control the rate at which the product exits the reaction zone and, in conjunction with the feed rate, thereby controlls the retention time in the reactor. The vent allowing escape of the gaseous by-products from the front of the reaction zone is connected by suitable piping to a point in the reactor located above the exit gate so that some, or all, of the gaseous by-products can be recycled into the reaction zone to provide a reaction product having a pH in the range of about 4.5 to 6.5. It is generally desirable to provide paddles with varying pitch. Thus the paddles can be at 45° forward pitch, 45° reverse pitch or flat (zero pitch). By varying the combination of the paddles, control is provided over the degree of forward motion of the product in the reactor zone and the extent to which backmixing occurs. This, in turn, controls the throughput of the reacting mass.

In carrying out the process of the present invention, two alternative feeds may be used, each of which will effectively produce the desired crystalline water-insoluble ammonium polyphosphate in powdered form and at the desired pH value. A first reaction feed is a melt of urea and a condensed phosphoric acid, i.e., one of 90-100% concentration. The alternative reaction feed is a solid urea phosphate. The melt can be fed into the reaction zone by means of a metering pump and the solid can be fed thereto by means of a gravimetric belt feeder. When the solid urea phosphate is fed into the processor, a fluidizing agent should be added to ensure a free-flowing uniform stream is maintained. The proportions of urea and phosphoric acid in the melt should be stoichiometrically equivalent to urea phosphate or equal moles of urea and phosphoric acid.

The reaction zone is maintained at a temperature in the range of about 285° C. to about 400° C. As the reaction feed enters the reaction zone, the melt or melt that forms commences to foam, first changing into a viscous mass, then to a powder in conjunction with the action of the paddles. The viscous mass sticks to the surfaces of the reaction zone which include the paddles. As the paddles turn within the reactor zone, they serve to advance the reacting mass to the exit port while at the same time scraping the adhering reacting mass from the surfaces and providing the powdery form.

The powdery solid that forms in the reaction zone is advanced to the exit port therefrom at a rate which is consistent with the formation of crystalline water-insoluble ammonium polyphosphate. The length of travel of the reactants through the reaction zone, the rate of throughput as effected by the pitch of the paddles, as well as the height of exit gate, which is variable, all cooperate to ensure that proper residence time of reactants within the reaction zone is maintained to provide the desired crystalline water-soluble ammonium polyphosphate. At the beginning of a run, the product exiting from the reaction zone is constantly checked to determine the nature of the product and variations in processing controls that may be necessary.

As the solid approaches the exit port of the reaction zone, gaseous by-products vented from the front of the reaction zone can be recycled to the reaction zone and contact the solid to provide the product having a pH in the range of about 4.5 to 6.5. The rate of addition of gaseous by-products recycled should be controlled to provide the desired pH value in conjunction with the throughput rate of reactants.

Whereas the exact scope of the present invention is set out in the appended claims, the following specific example illustrate certain aspects of the present invention more fully, all parts and percentages therein being by weight unless otherwise specified.

COMPARATIVE EXAMPLE A

A feed is made by dissolving 120 parts of urea into 150 parts of 85% phosphoric acid and maintaining an inlet temperature of 90°-95° C. The melt is contained within a melt-recycle loop with a take-off point to the processor. With the processor jacket temperature at 321-327° C. and a feed rate of 73 parts per hour to the processor, 30 parts per hour of ammonium polyphosphate are achieved. The pH range of the product is 5.8-6.2 and the solubility is 11%. Analysis of the ammonium polyphosphate gives a phosphorous content of 27.5% (theoretical phosphorous is 32.5%). Showing that the product has a purity of 90%. This, coupled with the relatively high solubility, indicates relatively short chain polyphosphate units are being produced.

COMPARATIVE EXAMPLE B

A feed is made up by dissolving 63 parts of urea into 115 parts of 95% phosphoric acid and maintaining an inlet temperature of 100°-110° C. The melt is contained in a melt-recycle loop with a take-off point to the inlet of the processor. With the processor jacket temperature ranging between 321°-327° C., and a feed rate of 92 parts per hour, 50 parts per hour of ammonium polyphosphate are achieved. The pH range of the product is 5.0-5.2 and the solubility is 6.4%.

EXAMPLE 1

The procedure of Comparative Example B is followed in every material detail except that the gaseous by-products are directed to the exit port. The resulting ammonium polyphosphate has a pH range between 5.8-6.2. The phosphorous content was 30.5%, indicating that the purity of the ammonium polyphosphate is 94%. Table I below indicates the effect on the ammonium polyphosphate produced with the gaseous by-products in contact therewith.

TABLE I

| Example | Production Rate lb Processed/ Hour | pH | Solubility | Percentage Phosphorous |
|---|---|---|---|---|
| Comparative A | 30 | 5.8-6.2 | 11.0 | 27.5 |
| Comparative B | 50 | 5.0-5.2 | 6.4 | 30.5 |
| 1 | 50 | 5.8-6.2 | 6.4 | 30.5 |

The above data demonstrates that by processing the ammonium polyphosphate in contact with the gaseous by-products a product with increased chain length (evidenced by the lower solubility) and proper pH is attained.

COMPARATIVE EXAMPLES C-F

Urea phosphate is blended with 0.25% of a commercial fluidizing agent and fed into the inlet of the processor via a gavimetric belt feeder at various rates. The jacket temperature range is maintained at 321°-327° C. and no gaseous by-product is being recycled. The data in Table II indicates the effect on the polyphosphate chain length, the higher the solubility the lower the chain length and the higher the pH.

EXAMPLES 2-3

The procedure of comparative Examples C-F are followed in every material detail except that the gaseous by-products are recycled to a point at the exit gate. The data in Table II indicates the effect this recycling has upon the pH and solubility for the various production rates.

TABLE II

| Example | Production Rate lb Processed/ Hour | pH | Solubility | Percentage Phosphorous |
|---|---|---|---|---|
| Comparative C | 50.1 | 5.7 | 6.4 | 30.5 |
| Comparative D | 36.9 | 3.5 | 6.0 | 32.7 |
| Comparative E | 16.7 | 3.4 | 5.6 | 32.7 |
| Comparative F | 12.8 | 3.4 | 5.0 | 32.6 |
| Example 2 | 16.7 | 5.8–6.0 | 5.6 | 32.7 |
| Example 3 | 12.8 | 5.8–6.0 | 5.0 | 32.6 |

The above data demonstrates that at production rates of 37 parts/hour or lower, virtually pure polyphosphate is made. When made without the recycled gaseous by-products the pH is found to be below the desired range, however, superior results are gained when the gaseous by-products are allowed to contact the final product through production by way of the present invention.

We claim:

1. A process for preparing a crystalline water-insoluble ammonium polyphosphate of the general formula:

$$H_{(n-m+2)}(NH_4)_m P_n O_{(3n+2)}$$

wherein n is an integer having an average value greater than 10, $m/n$ has an average value in the range of about 0.7 to 1.1, and the maximum value of m is equal to $n+2$, which process comprises feeding a melt of urea and a condensed phosphoric acid or a solid urea phosphate into the inlet of a jacketed oval-shaped tubular shell reaction zone maintained at a temperature in the range of about 285° C. to about 400° C. to provide a fuming viscous melt which adheres to surfaces of said reaction zone; venting gaseous products from said fuming viscous melt from a vent in the entry end of said reaction zone; constantly removing adherents from said surfaces to provide a powdery solid and advancing said solid to an exit end of said reaction zone at a rate consistent with formation of ammonium polyphosphate by driven paddles; and controlling release of said solid from said exit while recycling said gaseous products vented from said entry end of said reaction zone to said exit end thereof to provide a solid product having a pH in the range of about 4.5 to 6.5 as it exits said reaction zone.

* * * * *